United States Patent Office 3,492,392
Patented Jan. 27, 1970

3,492,392
METHOD OF MOLDING REINFORCED PLASTICS
Hiroshi Kasamatsu, Tochigi-ken, and Noriyoshi Akabane, Gumma-ken, Japan, assignors to Fuji Jyu-Kogyo Kabushiki Kaisha, Tokyo, Japan
Continuation-in-part of application Ser. No. 202,737, June 15, 1962. This application Apr. 21, 1967, Ser. No. 632,638
Int. Cl. B32b 31/12; B29h 9/02; B28b 5/00
U.S. Cl. 264—257                                            5 Claims

ABSTRACT OF THE DISCLOSURE

Molding shaped panels of reinforced resin by placing flexible film of polyvinyl alcohol over a surface, squeezing air out of space between film and surface, spreading over the film a thermosetting resin composition containing a curing agent, placing a mat of fibers over the resin layer, placing a second film of polyvinyl alcohol over the assembly, and working the second film to remove air from assembly, placing assembly over a shaped mold and bringing assembly into close contact with the surface of the mold and thereafter curing the resin.

---

This application is a continuation-in-part of U.S. application Ser. No. 202,737, filed June 15, 1962, now abandoned.

This invention relates to a method of molding shaped reinforced plastic panels. Specifically, it relates to a method for low pressure molding of shaped reinforced plastic panels such as roof panels for automobile of glass-fiber reinforced, unsaturated polyester resin.

Up to date, such reinforced plastic panels have been molded by various methods, a popular one being the metal mold molding. However, this method and the others have many drawbacks. Some of these are as follows:

(1) It requires the use of precise and high strength molds consisting of accurately shaped male and female molds. The cost of such molds is usually very expensive.

(2) Since plastic materials contract during curing, for large size molding, complicated and large size pressing equipments and molds are required resulting in high equipment cost.

(3) Some kind of releasing agents or a mold lubricants are required.

(4) Such apparatus is not applicable to high production requirements.

The object of this invention is to provide an improved method which can overcome many of these drawbacks.

Attached drawings illustrate certain embodiments of this invention.

Figure 1:
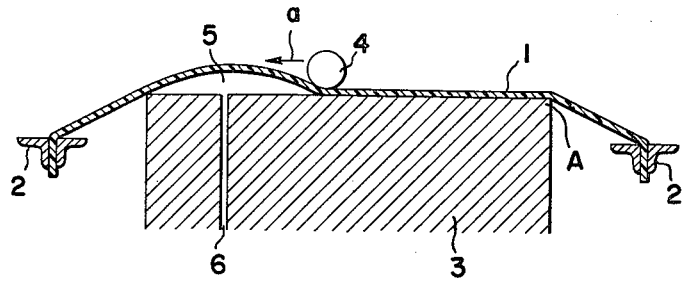
FIG. 1 is a cross-section showing the first step of the method according to the present invention.

The method of the present invention comprises the steps of (a) tightening a flexible film 1 of polyvinyl alcohol flat with a square frame 2 which has an area larger than that of the top surface of a work table 3, placing the framed flexible film over the surface of the work table 3, and squeezing the film with a squeezing roll 4 thereby to drive air completely out of the space between the film and work table surface and to secure a close contact therebetween, (b) spreading an fluid unsaturated polyester resin composition compounded with curing agent and pigment over the flexible film 1 which has been laid in close contact with the work table surface, and squeezing the film 1' with the a mat or fabric 8 of glass fiber or other natural or synthetic fiber over the layer 7, if necessary further piling a monofilament mat 9 thereon, then placing another flexible film 1' of polyvinyl alcohol held flat by a frame 2' over them, combining both frames 2 and 2' together to seal the polyester resin layer 7, mat 8 and mat 9 between the upper and lower flexible films partitioned by the edges of the work table surface, and squeezing the film 1' with the squeezing roll thereby to remove air from the laminates and, at the same time, impregnating the mats with the fluid polyester resin, (c) transferring said laminated reinforced plastic material 13 thus sandwiched between the polyvinyl alcohol films 1, 1' from the work table 3 onto a shaping mold 10, then depressing the assembled frames 2, 2' downwardly or thrusting the mold 10 upwardly thereby to press the reinforced plastic layer against the surface 10 of the mold, and further thrusting pressing mold 11 and 12 against some concave portions of the mold 10 to shape concave portion, (d) allowing the resulting assembly to stand or placing it in a heating oven thereby to cure the resin, and (e) taking the cured molding 13 out of the mold, trimming it if necessary, and stripping the polyvinyl alcohol films 1, 1' therefrom.

According to the present invention it is very important to use the framed flexible films of polyvinyl alcohol. These films are bent at the edges or corners A, A' of the top surface of the shaping mold. Therefore, the reinforced plastic composition enclosed between the upper and lower flexible films 1, 1' is completely sealed in a zone partitioned by the edges, and during operation, there is no possibility of air being trapped in the plastic laminate, and formation of air bubbles in the shaping mold is completely precluded, and thus shaped articles can be produced which has high strength and very smooth and fine appearances.

In the present invention, soft polyvinyl alcohol films as the flexible film are required to retain a water content in the range of 10 to 15%. In order to secure the water content, it is necessary to maintain the atmosphere of the working room at a relative humidity of 70 to 75%.

The plastic material to be used is an unsaturated polyester resin, which may be of any desired type commercially available. Useful reinforcing materials include mats and fabrics of glass fiber, cotton, nylon and vinylic fiber.

In the steps (b) and (c) it is important that some amount of plastic resin is flown slightly outwardly of the bending lines A, A' of the flexible films. Any intrusion of air from the outside into the sealed plastic composition can thus be completely prevented.

The advantageous features of this invention will be more fully understood from the following example, which illustrates how a motor car roof is manufactured from reinforced polyester resin in accordance with the present invention.

As shown in FIG. 1, a polyvinyl alcohol film 1 which has a water content of 10 to 15% and a thickness of 20 microns, is set on a film stretching frame 2 which has larger dimensions than the flat work table 3 and mold 10 and the framed film is placed on the work table 3. With a roll 4 of rubber or felt, air 5 is squeezed out of the space between the work table and film.

The work table 3 has a top surface enough to permit thereon the impregnation of a glass-fiber sheet of a desired size with a desired resin composition. Also, it is provided with an air vent 6, which facilitates setting of the film 1 on the table.

Next, an unsaturated polyester resin composition 7 compounded with usual percentages of curing agent and pigment in an amount necessary for molding is poured on the polyvinyl alcohol film 1 already placed on the work table 3 and is spread to a substantially uniform thickness.

As the curing agent, methyl ethyl ketone peroxide, benzoyl peroxide, cobalt naphthenate, or the like is used.

Then, a mat or fabric 8 of glass fiber or natural or synthetic organic fiber cut to a desired size is placed as a reinforcing material over the resin composition layer 7. When a mat is used, a single layer of chop strand mat having a weight of 775 to 850 g./m² will suffice for a shaped article to have a thickness of 2 mm. Where the outward appearance or durability is likely to be injured by the exposed glass strands on the surface of shaped article, it is advisable to further cover the surface with a monofilament mat 9 for example weighing about 30 g./m.².

Figure 2:
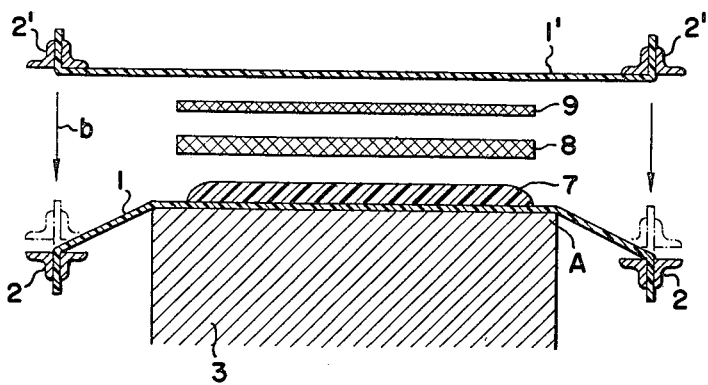
FIG. 2 shows the second step of the method of this invention.

Another polyvinyl alcohol film 1' (having a thickness of 30 microns) which is held by a frame 2' in the same way as the flexible film 1 is superposed on the laminate of resin 7 and glass-fiber sheets 8, 9, and the film frames 2, 2' are fitted together as shown in FIG. 2.

Thereafter, by means of the squeezing roll 4 remaining air is squeezed out of the laminate. As some tension is given to the films 1, 1' by the frames 2, 2' and work table 3, the defoaming operation is easily performed. On completion of the defoaming, the resin 7 completely fills in the glass-fiber sheets 8, 9 and some amount of the resin flows out of the edges A and A'.

Figure 3:
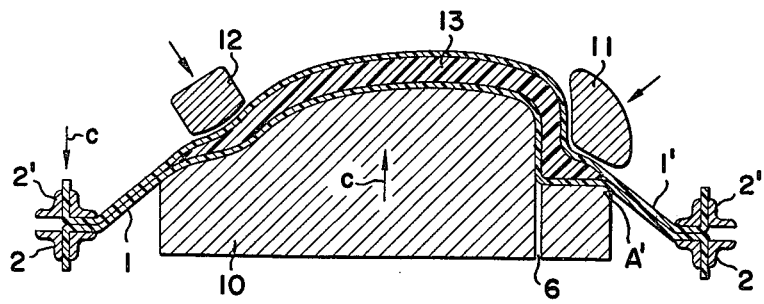
FIG. 3 shows the last step of the method of this invention.

The laminate 13 thus formed of the resin composition and glass fiber covered on both sides with the two polyvinyl alcohol films 1, 1' is transferred from the work table 3 onto a mold 10. With a relative motion C of the film frames 2, 2' and mold 10, the films are pressed against the surface of the mold 10. Further, with the use of pressing mold 11, 12, the concave portions on the surface of the mold 10 is shaped to a desired configuration. This state is shown in FIG. 3.

While the films are kept pressed against the mold, the unsaturated polyester resin in the resin composition 7 will attain a gradual increase in the viscosity with the lapse of time until it becomes solid and hard. In practical operation, the curing is promoted by the application of heat. Since premature heating may fluidize the uncured resin to an extent more than necessary and may invite ununiformity in thickness, waving, or unsmooth surface, it is advisable to heat the resin when it has lost most of its fluidity.

Upon hardening, the shaped article 13 is trimmed to a desired configuration. When stripped of the polyvinyl alcohol films 1, 1', the shaped product will have a fine and lustrous surface which can be directly used as a roof for automobile.

The products having glass content of 25 to 35% manufactured in the way as above described have tensile strength in the range of 8 to 12 kg./mm.², thickness of 2±0.5 mm., and desired color with excellent luster.

We claim:
1. A method of molding shaped panels for use in body parts of motorcar, hull of motorship and containers from reinforced resin which comprises the steps of placing on the flat top surface of a work table a flexible and extensible film of polyvinyl alcohol framed on a square frame of a size larger than the top surface area of the work table, squeezing air out of the space between the film and work table to secure the two in close contact with each other, pouring and spreading over the flexible film a resin composition of thermosetting resin compounded with pigment and curing agent thereby forming a layer, placing thereon a mat of fiber selected from a group consisting of glass fiber, natural fibers and synthetic fibers, further superposing a polyvinyl alcohol film framed on a square frame of a size larger than the top surface area of the work table thereon, combining the two frames and thrusting them against the work table, rolling the surface of the upper layer of flexible film with a squeezing roll to withdraw air from the resin and films and at the same time to make a reinforced resin assembly covered with the flexible films, placing the assembly over a shaping mold having a desired convex surface and a size smaller than that of the frames, thrusting the frames downwardly thereby to press the assembly into close contact with the upper surface of the mold, thereby to shape the assembly into the desired convex surface panel and thereafter curing the resin in this state.

2. A method as defined in claim 1, wherein the assembly in close contact with the mold is pressed with a pressing mold at the concave portions of the mold from outside.

3. A method as defined in claim 1, wherein the thermosetting resin is an unsaturated polyester resin.

4. A method as defined in claim 1 wherein a monofilament mat is additionally superposed on the fiber mat.

5. A method as defined in claim 1 wherein the shaped panel is for use as a roof for automobile.

References Cited

UNITED STATES PATENTS

| | | | |
|---|---|---|---|
| 2,652,597 | 9/1953 | Sucher | 264—316 XR |
| 2,796,634 | 6/1957 | Chellis | 264—296 XR |
| 2,903,388 | 9/1959 | Jonke | 264—261 XR |
| 2,962,764 | 12/1960 | Trojanowski | 264—316 XR |
| 3,163,689 | 12/1964 | Ives | 264—90 |
| 3,306,956 | 2/1967 | Barnette | 264—313 XR |

ROBERT F. WHITE, Primary Examiner

R. R. KUCIA, Assistant Examiner

U.S. Cl. X.R.

156—247; 264—258, 313, 316